(12) United States Patent
Bonk et al.

(10) Patent No.: US 11,383,627 B2
(45) Date of Patent: Jul. 12, 2022

(54) SEAT FRAME SIDE MEMBER

(71) Applicant: FAURECIA AUTOMOTIVE SEATING, LLC, Auburn Hills, MI (US)

(72) Inventors: Jeffery Bonk, Chesterfield, MI (US); Robert Fitzpatrick, Holland, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/023,701

(22) Filed: Sep. 17, 2020

(65) Prior Publication Data

US 2022/0080867 A1 Mar. 17, 2022

(51) Int. Cl.
*B60N 2/68* (2006.01)
*B60N 2/235* (2006.01)
*B60N 2/64* (2006.01)
*B60R 21/207* (2006.01)
*B33Y 80/00* (2015.01)

(52) U.S. Cl.
CPC .............. *B60N 2/68* (2013.01); *B60N 2/235* (2013.01); *B60N 2/64* (2013.01); *B60R 21/207* (2013.01); *B33Y 80/00* (2014.12)

(58) Field of Classification Search
CPC ........ B60N 2/235; B60N 2/68; B60N 2/2356; B60N 2/682
See application file for complete search history.

(56) References Cited

U.S. PATENT DOCUMENTS

| 4,736,986 A * | 4/1988 | Kato .................... B60N 2/2352 297/362 |
| 4,775,186 A * | 10/1988 | Nishino ............... B60N 2/2352 248/429 |
| 6,378,946 B1 | 4/2002 | Cope et al. |
| 7,093,901 B2 * | 8/2006 | Yamada .................... B60N 2/22 297/354.12 |
| 8,523,284 B2 | 9/2013 | Yamada et al. |
| 9,486,949 B2 | 11/2016 | Evans et al. |
| 2017/0036578 A1 | 2/2017 | White et al. |
| 2018/0334065 A1 * | 11/2018 | Suzuki .................... B60N 2/688 |

(Continued)

FOREIGN PATENT DOCUMENTS

| DE | 2927544 A1 * | 1/1981 | .......... B60N 2/2352 |
| DE | 102014211877 A1 * | 12/2014 | .......... B60N 2/2252 |
| JP | 2013189065 A * | 9/2013 | ............... B60N 2/68 |

(Continued)

*Primary Examiner* — Timothy J Brindley
(74) *Attorney, Agent, or Firm* — Reising Ethington P.C.

(57) ABSTRACT

A seat frame side member includes a frame body and a structural attachment point configured to connect a seat feature to the seat frame side member. The structural attachment point includes a projection extending from the frame body to a distal end. The projection includes a seat feature receiving portion at the distal end of the projection and a seat feature seating portion between the seat feature receiving portion and the frame body, and the seat feature receiving portion has a cross-sectional thickness that is different from a cross-sectional thickness of the seat feature seating portion. The seat frame side member can have an anisotropic microstructure with a plurality of layers built by additive manufacturing.

17 Claims, 6 Drawing Sheets

(56) References Cited

U.S. PATENT DOCUMENTS

2019/0061581 A1    2/2019  White et al.
2020/0282874 A1*   9/2020  Motoi .................. B60N 2/2356

FOREIGN PATENT DOCUMENTS

| KR | 20170062586 A      * | 6/2017  |            |
|----|----------------------|---------|------------|
| WO | WO-2005100078 A2   * | 10/2005 | ........... B60N 2/2254 |
| WO | WO-2010081508 A1   * | 7/2010  | ........... B60N 2/2356 |
| WO | WO-2013137259 A1   * | 9/2013  | ............... B60N 2/68 |
| WO | WO-2019204920 A1   * | 10/2019 | ............... B60N 2/22 |

* cited by examiner

SEAT FRAME SIDE MEMBER

TECHNICAL FIELD

The present disclosure relates to a vehicle seat and, in particular, to a seat frame side member for a vehicle seat.

BACKGROUND

Seat frames for a vehicle seat back or seat cushion typically comprise two side members connected by a cross beam and an upper cross member. U.S. Patent Application Publication 2017/0036578 to White et al. discloses forming the seat frame, and more particularly, forming the side members, with an additive manufacturing process. The additive manufacturing process provides the ability to create thin-walled structures and varied amounts of material at certain load points. However, additive manufacturing can be used to enhance how the side member is connected to other portions of the frame and/or seat.

SUMMARY

In accordance with one or more embodiments, there is provided a seat frame side member comprising a frame body and a structural attachment point configured to connect a seat feature to the seat frame side member. The structural attachment point includes a projection extending from the frame body to a distal end. The projection includes a seat feature receiving portion at the distal end of the projection and a seat feature seating portion between the seat feature receiving portion and the frame body. The seat feature receiving portion has a cross-sectional thickness that is different from a cross-sectional thickness of the seat feature seating portion.

In some embodiments, the frame body and the structural attachment point have an anisotropic microstructure with a plurality of layers.

In some embodiments, the plurality of layers is built in a substantially longitudinal direction or a substantially transverse direction.

In some embodiments, the structural attachment point is a cross beam connector.

In some embodiments, the seat frame side member includes a plurality of cross beam connectors arranged circumferentially.

In some embodiments, the cross-sectional thickness of the seat feature receiving portion is less than the cross-sectional thickness of the seat feature seating portion.

In some embodiments, there is a seat frame having a cross beam connected to the cross beam connector, and a weld seam connects the cross beam to the cross beam connector.

In some embodiments, the weld seam passes through the seat feature receiving portion.

In some embodiments, the structural attachment point is a suspension joint.

In some embodiments, the suspension joint is a ball and socket joint.

In some embodiments, the structural attachment point is an airbag retainer.

In some embodiments, the structural attachment point is a recliner pocket.

In some embodiments, the cross-sectional thickness of the seat feature receiving portion is less than the cross-sectional thickness of the seat feature seating portion.

In some embodiments, there is a seat frame having a recliner connected to the recliner pocket, and a weld seam connects the recliner to the recliner pocket.

In some embodiments, the weld seam passes through the seat feature receiving portion.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Example embodiments will hereinafter be described in conjunction with the appended drawings, wherein like designations denote like elements, and wherein.

DETAILED DESCRIPTION

The vehicle seat described herein includes a seat frame having a seat frame side member formed by additive manufacturing. The seat frame side member has a frame body and an integrally built structural attachment point that promotes connection between a seat feature (e.g., a suspension component, a recliner, a cross beam, airbag, etc.) and the frame body. Particularly optimized structural attachment points can help provide a better weld joint or other mechanical junction when the seat frame side member is attached to other components of the vehicle seat. The structural attachment points can include one or more projections where the shape is strategically modified to promote attachment of the seat features to the seat frame side member. Unlike typical stamped side frame members, the geometry of the structural attachment points can be advantageously optimized to help promote attachment and increase the structural integrity of the vehicle seat.

Figure 1:
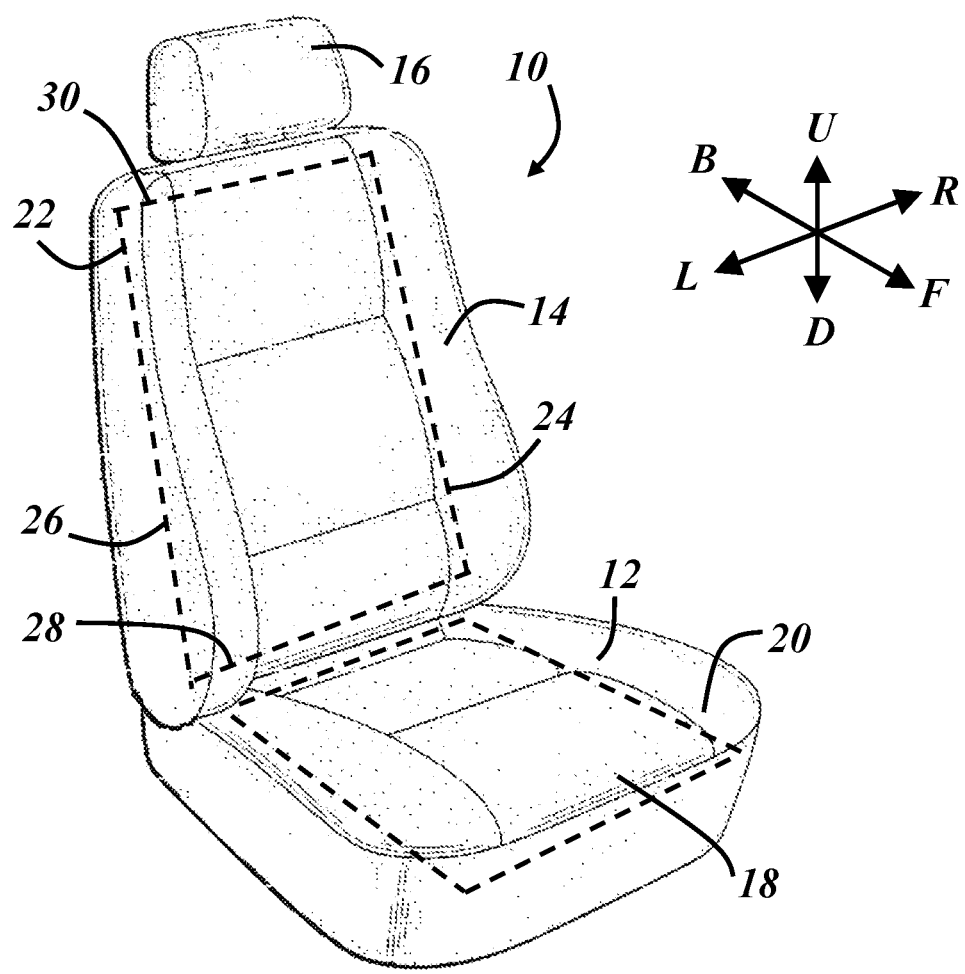
FIG. 1 is a perspective view of an embodiment of a vehicle seat equipped with a seat frame side member.

FIG. 1 illustrates an exemplary vehicle seat 10 adapted for installation in the passenger cabin of a vehicle via rails along the underside of the seat or other suitable attachment features. The seat 10 includes a seat bottom 12 that supports the majority of the weight of a seat occupant when in use and a seat back 14 extending from the seat bottom. The seat back 14 includes a head rest 16 in this example. Forward (F) and back or rearward (B) directions are designated in FIG. 1 and may be referred to as longitudinal directions. Upward (U) and downward (D) directions may be referred to as vertical directions, while left (L) and right (R) may be referred to as transverse directions. These directions are with respect to the seat 10 and not necessarily with the vehicle in which the seat is installed. The seat 10 presents a seating surface 18 in the form of an exterior surface of a trim cover 20. Each of the seat bottom 12 and the seat back 14 includes a portion of the seating surface 18, which is in contact with the seat occupant in use. The trim cover 20 covers one or more foam layers, cushions, etc. and an underlying frame 22 which is diagrammatically illustrated with dotted lines in FIG. 1.

For the seat back 14, the seat frame 22 includes two seat frame side members 24, 26, a lower cross beam 28 and an upper cross beam 30. The frame 22 at the seat bottom 12 may be similarly structured. A substantial portion of the description is focused on the seat frame side member 24, but it should be recognized that the teachings relating to the side member 24 may be applicable to the other parts of the frame 22. The frame 22, and more particularly, the side members 24, 26 are advantageously made using an additive manufacturing or three-dimensional printing process.

Figure 2:
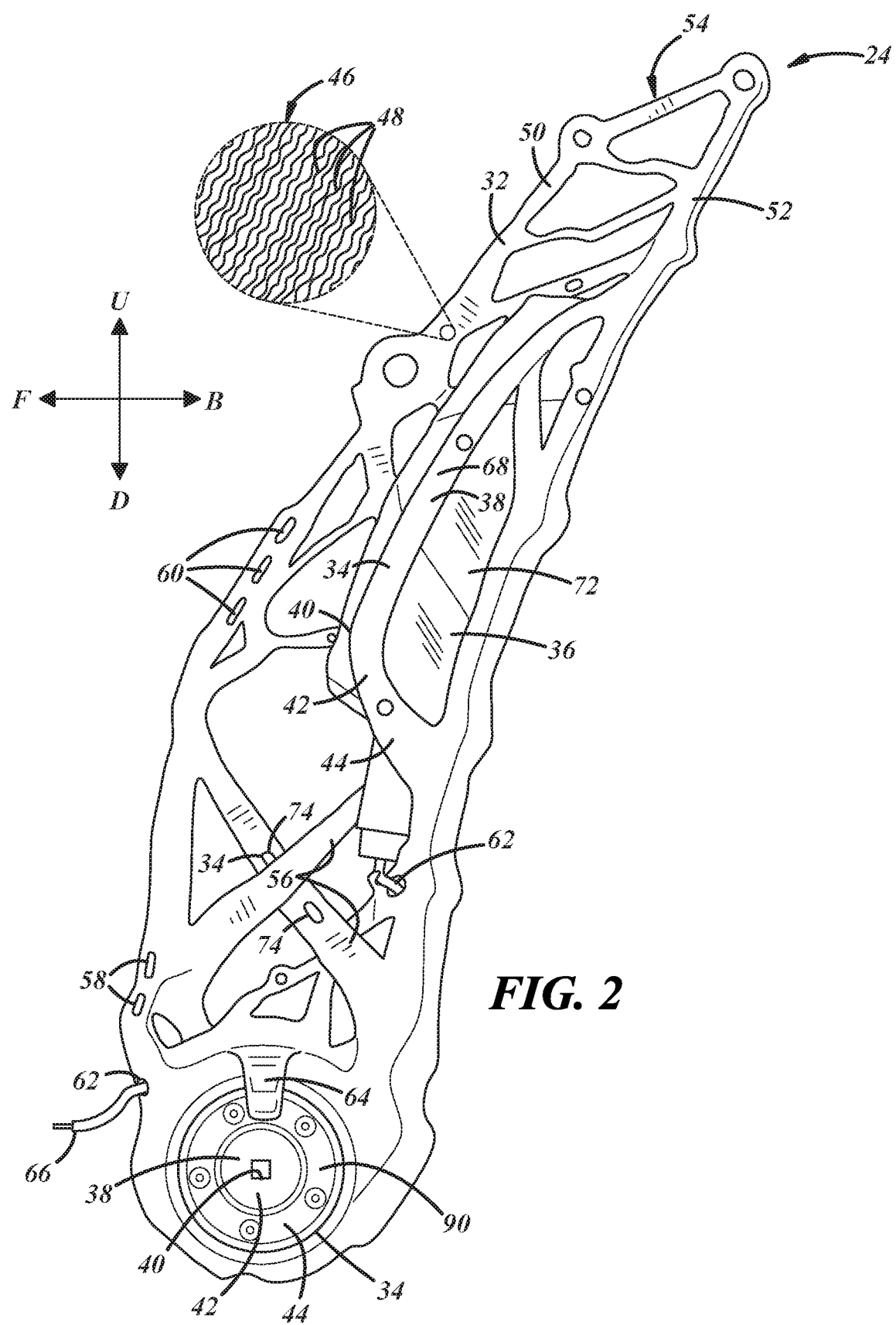
FIG. 2 is a side view of a seat frame side member and also shows an example view of the microstructure of the seat frame side member.
Figure 3:
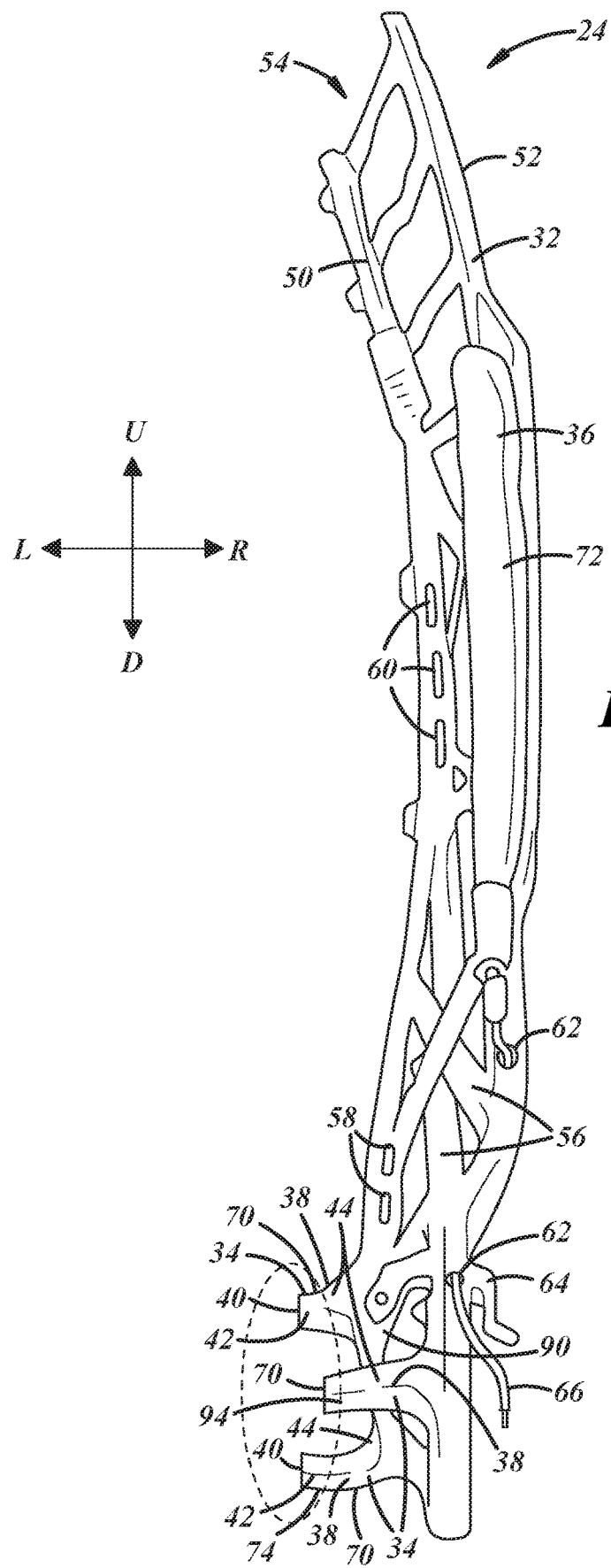
FIG. 3 is a front view of the seat frame side member of FIG. 2.

FIGS. 2 and 3 show various views of one embodiment of the seat frame side member 24. The seat frame side member 24 includes a frame body 32 and one or more structural attachment points 34 that are configured to connect a seat feature 36 to the seat frame side member. Each structural attachment point 34 includes a projection 38 extending from the frame body 32 to a distal end 40. The projection 38 includes a seat feature receiving portion 42 at the distal end 40 and a seat feature seating portion 44 between the seat feature receiving portion 42 and the frame body 32. The seat feature receiving portion 42 and the seat feature seating portion 44 have varying cross-sectional thicknesses, which is detailed further below. This variation in cross-sectional thickness can be optimized to facilitate stronger attachment between the seat frame side member 24 and one or more seat features 36, particularly when compared to more traditional stamped side members that have a consistent thickness.

As shown in FIG. 2, the seat frame side member 24 includes an anisotropic microstructure 46 having a plurality of layers 48. The anisotropic microstructure 46 and layers 48 are only schematically illustrated in FIG. 2, and are not necessarily to scale. To impart the microstructure 46, an additive manufacturing process is used to build the frame body 32 with fully integrated structural attachment points 34. The layers 28 can advantageously be built to increase strength in a particular force direction. For example, with the anisotropic microstructure 46, properties such as the tensile strength and break elongation can be comparatively better with respect to a force direction that is perpendicular to the direction in which the plurality of layers 48 are built. Thus, in some embodiments, it may desirable to have the plurality of layers 28 built in a substantially longitudinal direction or a substantially transverse direction to impart strength in a particular force direction. In the FIG. 2 embodiment, the plurality of layers 28 are built in a substantially longitudinal direction (from front (F) to back (B) or vice versa). "Substantially," as used herein to indicate the directional build of the microstructure 46, means a variation from the direction in the designated coordinate system (F/B, U/D, L/R) that is less than or equal to 20° in either direction. With respect to FIG. 2, the plurality of layers 28 are built in a substantially longitudinal direction, which can help improve the strength of the seat frame side member 24 in the F-B direction. In other embodiments, the plurality of layers 28 can be built in another direction, such as a substantially transverse direction, which can help improve the strength of the seat frame side member 24 in the L-R direction.

The additive manufacturing process used to build the seat frame side member 24 may vary depending on the desired material and construction. In an advantageous embodiment, the seat frame side member 24 is aluminum-based or stainless steel. With these materials, a selective laser melting (SLM) process, a direct metal laser sintering (DMLS) process, or another powder-bed additive manufacturing process may be used to build the seat frame side member 24, to cite a few examples. Other additive manufacturing processes may be used and may vary depending on the material. For example, if some sort of composite material is used for the seat frame side member 24, a different additive manufacturing process may be used to build the microstructure 46. This manufacturing process may help reduce capital expenditures and carbon footprint as compared to stamping plants or the like. Further, leveraging the power of additive manufacturing can create intelligently integrated frame components. Providing a higher level of part integration can help reduce secondary operations and additions. This integration can result in fewer parts to manage, faster manufacturing, and can reduce labor costs, manufacturing costs, transportation costs, etc.

The frame body 32 includes two vertical extension rails 50, 52 and a network 54 of interwoven cross-pieces 56 connecting the two vertical extension rails 50, 52 (only a limited number of cross-pieces 56 are labeled for clarity purposes). The network 54 of interwoven cross-pieces 56 can advantageously have a biosympathetic shape, which is at least partly possible due to the additive manufacturing production method. The frame body 32 can have structural attachment points 34 that are integrally built into one or more of the extension rails 50, 52 or into one or more of the cross-pieces 56 ("integrally built" means formed in the same initial additive manufacturing forming process, and not attached in a subsequent joining process or machined in a separate machining process). Having the structural attachment points 34 integrally built into the frame body 32 can result in a more structurally sound frame assembly 22 and seat 10. The frame body 32 can include various features such as integrally built intake air channels 58 and exhaust air channels 60, which provide for internal ventilation distribution through the frame body 32. Integrally built internal wire routing holes 62 can help improve the integration of various components by providing a housing for wires, cables, etc. through the side member 24. An integrally built recliner stop 64 can replace a typically welded on bracket. In some embodiments, the features 58, 60, 62, 64 may include a structural attachment point 34 to help attach a seat feature (e.g., the internal wire routing holes 62 can include one or more structural attachment points 34 to help hold the wire 66 in place).

The structural attachment points 34 can help attach various seat features 36, including but not limited to, cross beams, recliners, suspensions, airbags, etc. In FIGS. 2 and 3, one structural attachment point 34 is an airbag retainer 68, and with particular reference to FIG. 3, another structural attachment point 34 includes a plurality of cross beam connectors 70. As will be detailed further below, the shape of the structural attachment points 34 is designed to help facilitate optimum attachment. This optimization can be achieved by varying the shape to better accommodate the seat feature 36 (e.g., conformability to the shape of the seat feature 36) or by varying the shape to facilitate fastening (e.g., thinner portions in weld regions). With regard to the integrally built airbag retainer 68, the structural attachment point 34 provides attachment points and a chute to help direct the airbag 72 to deploy in the right direction (e.g., the structural attachment point 34 can allow for bolting in or snapping in of the airbag 72). The integrally built cross beam connectors 70 are circumferentially oriented to accommodate the lower cross beam 28. In this arrangement, the cross beam connectors 70 are placed or otherwise incorporated along the perimeter with respect to the cross beam 28 to be connected. This allows for each cross beam connector 70 to, at least in part, encircle the respective end of the cross beam 28. This circumferential orientation can be sized to closely accommodate the size of the cross beam, which can help lessen a potential gap between the connectors 70 and the cross beam 28, thereby promoting attachment. Further, the cross beam connectors 70 are designed to facilitate optimum laser welding. A laser weld seam 74, which is schematically represented with dotted lines in FIG. 3, can provide a stronger connection at the seat feature receiving portion 42, which in this embodiment, has a smaller cross-sectional thickness than the seat feature seating portion 44. This can enhance and strengthen the bond between the seat frame side member 24 and the lower cross beam 28.

Figure 4:
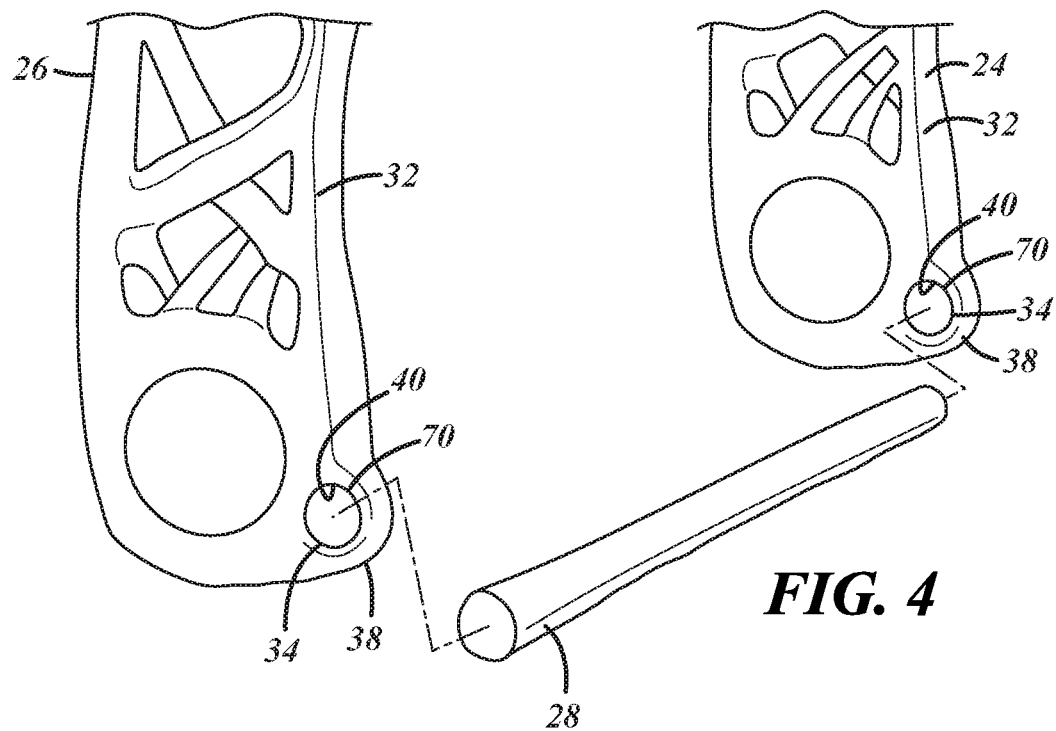
FIG. 4 is a partial view of two seat frame side members and a cross beam according to one embodiment.
Figure 5:
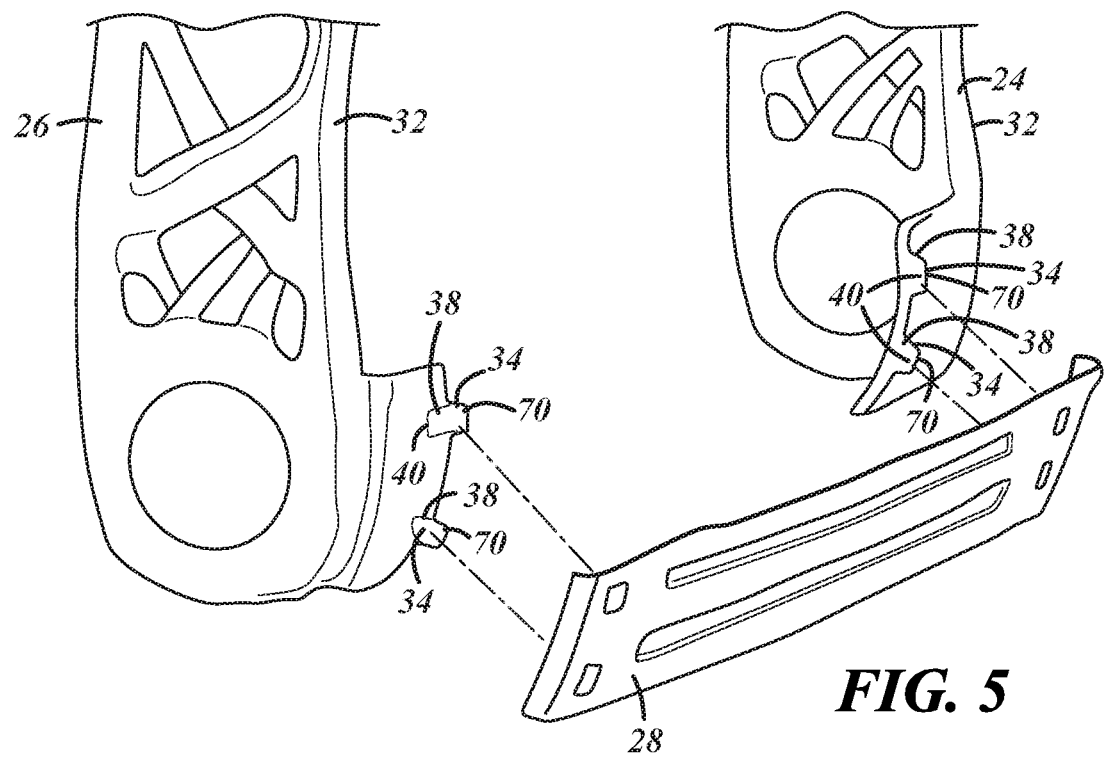
FIG. 5 is a partial view of two seat frame side members and a cross beam according to one embodiment.

FIGS. 4 and 5 show alternate embodiments of the integrally built cross beam connectors 70. The size and shape of the cross beam connectors 70 can vary depending on how the cross beam 28 is connected to the side members 24, 26. For example, the cross beam connectors 70 can be modified for various connection types, including but not limited to end forming (e.g., mushroom type), welding, fasteners, adhesives, rivets, etc. In the FIG. 4 embodiment, the distal end 40 of the projection 38 is the inner circle for receiving the cross beam 28. In the FIG. 5 embodiment, the distal end 40 of each projection 38 is a free distal end that extends in its entirety from the projection 38 and the frame body 32.

Figure 6:
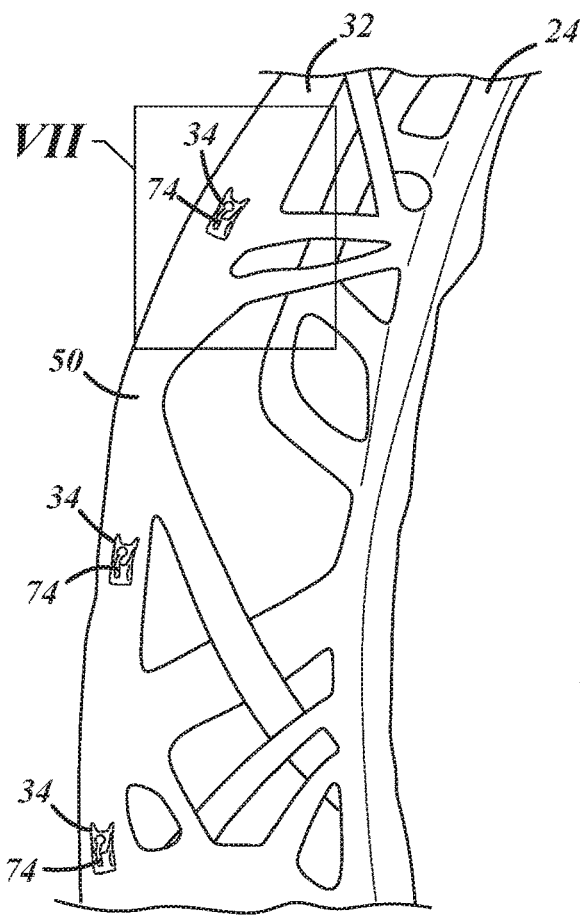
FIG. 6 is a partial view of a seat frame side member according to one embodiment.
Figure 7:
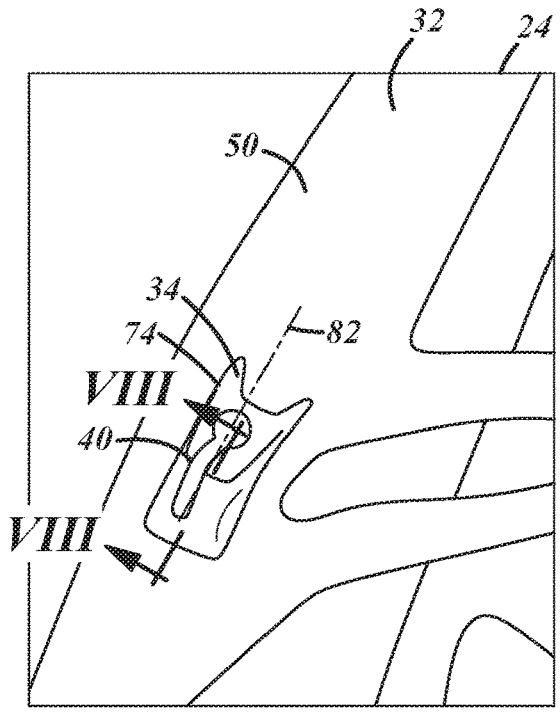
FIG. 7 is an enlarged view of a suspension joint from the seat frame side member of FIG. 6.
Figure 8:
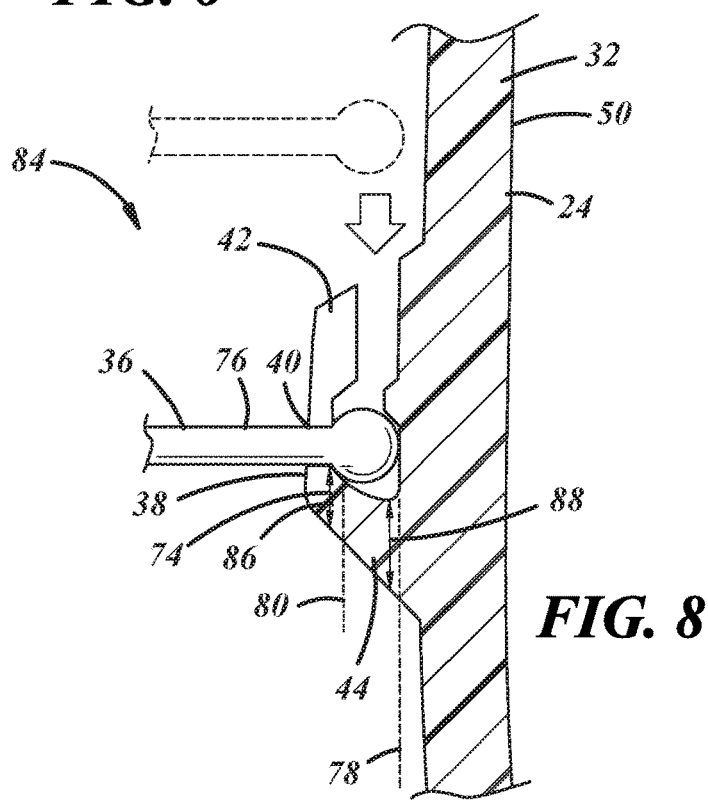
FIG. 8 is a cross-sectional view of the suspension joint of FIG. 7.

FIGS. 6-8 show structural attachment points 34 in the form of integrally built suspension joints 74. The suspension joints 74 can accommodate a suspension seat feature 36, 76 that is attached to the side frame member 24. In one embodiment, there are about three to five suspension joints 74 located along the vertical extension rail 50 of the frame body 32. In some embodiments, there can be one or more suspension joints 74 located on one or more cross-pieces 56 (see e.g., FIG. 2). Typically, the suspension joint consists of a standard hook or metal loop that is attached in a subsequent operation, but the integrally built suspension joint 74 can be integrally built or printed in the same forming operation as the frame body 32.

The variation in cross-sectional thickness of the projection 38 of the structural attachment point 34 is shown, for example, in FIG. 8. The projection 38 starts at the frame body 32 (either at one of the vertical extension rails 50, 52 or at a cross-piece 56), as indicated by the dotted line 78. The projection 38 extends from the start 78 to the distal end 40. The distal end 40 is typically the farthest point of the projection 38 from the frame body 32. The projection 38 is split in half, as indicated by dotted line 80 to demarcate a boundary between the seat feature receiving portion 42 and the seat feature seating portion 44. When analyzing the cross-sectional thicknesses and the respective positions of the seat feature receiving portion 42 and the seat feature seating portion 44, the cross-section can be taken at the midpoint or cross-section dividing line 82, as shown in FIG. 7. The cross-section dividing line 82 generally bisects the structural attachment point 34 through its longest dimension, as shown for example, in FIG. 7, which results in a cross-section analysis plane 84, as shown for example, in FIG. 8. To determine respective cross-sectional thicknesses, the thickness of each portion 42, 44 is taken at its thickest point in the cross-section analysis plane 84. This is illustrated in FIG. 8 at regions 86, 88, respectively. Accordingly, as shown in FIG. 8, the cross-sectional thickness 86 of the seat feature receiving portion 42 is less than the cross-sectional thickness 88 of the seat feature seating portion 44. The seat feature receiving portion 42, which allows for the receipt and travel of the seat feature 36 within the structural attachment point 34, is thinner. The seat feature seating portion 44, which provides an area for the seat feature 36 to rest within the structural attachment point 34, is thicker. This configuration can promote proper seating and attachment of the suspension 76, which in this embodiment, is a ball and socket joint.

Figure 9:
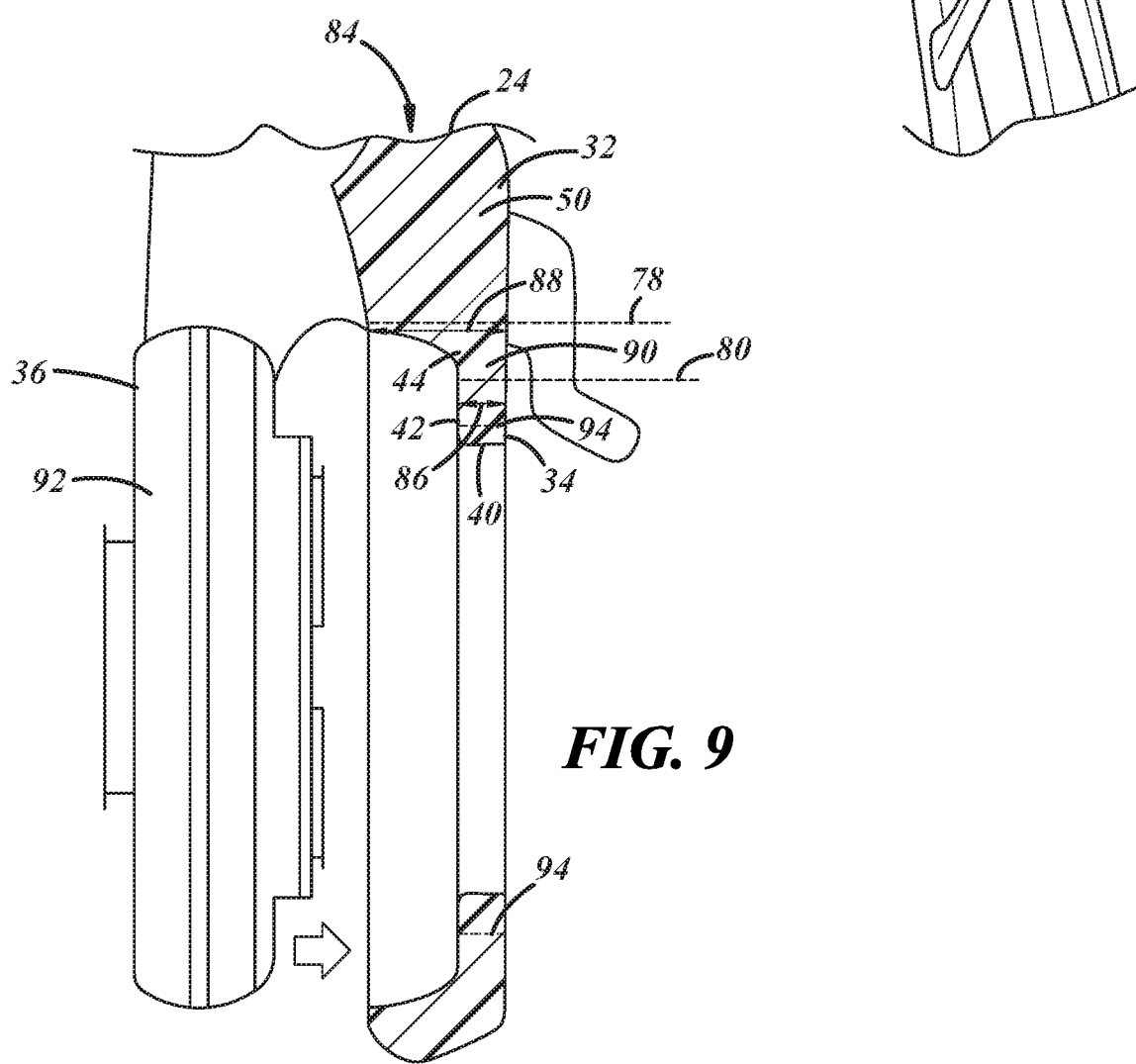
FIG. 9 is a partial view of a seat frame side member according to one embodiment with a recliner.

FIG. 9 illustrates a structural attachment point 34 in the form of an integrally built recliner pocket 90. In this embodiment, as well as the embodiment illustrated in FIGS. 2 and 3, the recliner pocket 90 includes a cross-sectional thickness 86 at the seat feature receiving portion 42 that is less than or smaller than the cross-sectional thickness 88 at the seat seating receiving portion 44. This can allow for attachment of a recliner 92, for example, at a weld joint location 94 indicated by a dotted line. This configuration is similar to the cross beam connectors 70 illustrated in FIG. 3, as the cross-sectional thickness is smaller toward the distal end 40 where a laser weld seam or weld joint 94 can be included to connect the structural attachment point 34 to the seat feature 36. This variation in cross-sectional thickness is advantageous for implementing the laser weld seam 94 while maintaining a solid, integral connection to the frame body 32. In some embodiments, for example, where attachment occurs at the seat feature seating portion 44 instead of at the seat feature receiving portion 42, it may be desirable to have a cross-sectional thickness 88 of the portion 44 be less than or smaller than the cross-sectional thickness 86 of the portion 42.

Figure 10:
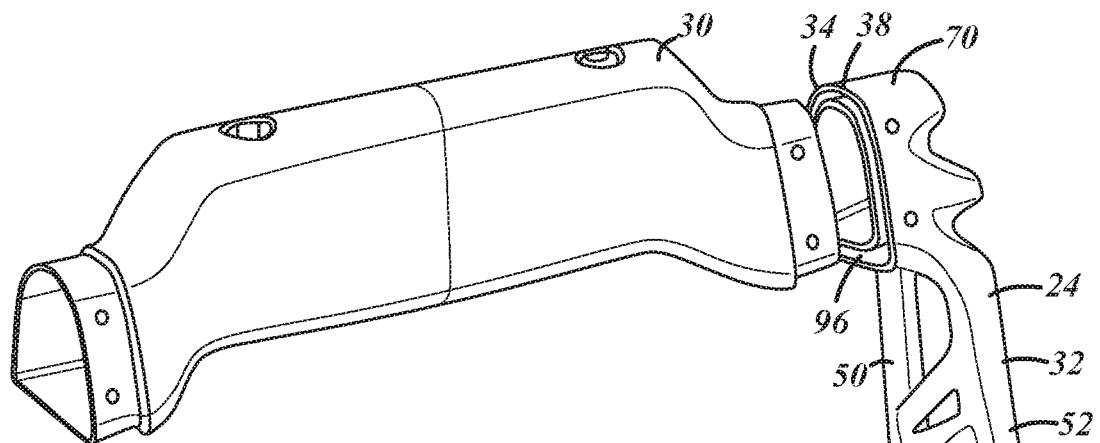
FIG. 10 is a partial view of a seat frame side member according to one embodiment with an upper cross beam.

FIG. 10 illustrates another embodiment of a cross beam connector 70 as an integrally built structural attachment point 34. In this embodiment, the cross beam connector 70 is designed to conformably mate with the upper cross beam 30. A recess 96 can be formed in the projection 38, having variable cross-sectional thicknesses to better accommodate and attach the upper cross beam 30.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A seat frame side member, comprising:
   a frame body; and
   a structural attachment point configured to connect a seat feature to the seat frame side member,
   wherein the structural attachment point includes a projection extending from the frame body to a distal end,
   wherein the projection includes a seat feature receiving portion at the distal end of the projection and a seat feature seating portion between the seat feature receiving portion and the frame body, and
   wherein the seat feature receiving portion has a cross-sectional thickness that is different from a cross-sectional thickness of the seat feature seating portion, wherein the frame body and the structural attachment point have an anisotropic microstructure with a plurality of layers.

2. The seat frame side member of claim 1, wherein the plurality of layers is built in a substantially longitudinal direction or a substantially transverse direction.

3. The seat frame side member of claim 1, wherein the structural attachment point is a cross beam connector.

4. The seat frame side member of claim 3, further comprising a plurality of cross beam connectors arranged circumferentially.

5. The seat frame side member of claim 3, wherein the cross-sectional thickness of the seat feature receiving portion is less than the cross-sectional thickness of the seat feature seating portion.

6. A seat frame, comprising:
   the seat frame side member of claim 5; and
   a cross beam connected to the cross beam connector, wherein a weld seam connects the cross beam to the cross beam connector.

7. The seat frame of claim 6, wherein the weld seam passes through the seat feature receiving portion.

8. The seat frame side member of claim 1, wherein the structural attachment point is a suspension joint.

9. The seat frame side member of claim 8, wherein the suspension joint is a ball and socket joint.

10. The seat frame side member of claim 1, wherein the structural attachment point is an airbag retainer.

11. The seat frame side member of claim 1, wherein the structural attachment point is a recliner pocket.

12. The seat frame side member of claim 11, wherein the cross-sectional thickness of the seat feature receiving portion is less than the cross-sectional thickness of the seat feature seating portion.

13. A seat frame, comprising:
    the seat frame side member of claim 12, and
    a recliner connected to the recliner pocket, wherein a weld seam connects the recliner to the recliner pocket.

14. The seat frame of claim 13, wherein the weld seam passes through the seat feature receiving portion.

15. The seat frame side member of claim 1, wherein the projection is at least partially curved.

16. The seat frame side member of claim 1, wherein the frame body and the structural attachment point are made of an aluminum-based material or a steel-based material.

17. A seat frame side member, comprising:
    a frame body; and
    a structural attachment point configured to connect a seat feature to the seat frame side member,
    wherein the structural attachment point includes a projection extending from the frame body to a distal end,
    wherein the projection includes a seat feature receiving portion at the distal end of the projection and a seat feature seating portion between the seat feature receiving portion and the frame body, and
    wherein the seat feature receiving portion has a cross-sectional thickness that is different from a cross-sectional thickness of the seat feature seating portion, wherein the cross-sectional thickness of the seat feature receiving portion and the cross-sectional thickness of the seat feature seating portion are defined by a thickest point on either side of a cross-section analysis plane that bisects the structural attachment point through a longest dimension of the projection.

* * * * *